United States Patent [19]

Bartolini

[11] Patent Number: 4,597,703
[45] Date of Patent: Jul. 1, 1986

[54] BALE HANDLING AND HAY DISTRIBUTING APPARATUS

[75] Inventor: Mauro Bartolini, Borgo San Lorenzo, Italy

[73] Assignee: Agrimac di Bartolini Mauro, Borgo San Lorenzo, Italy

[21] Appl. No.: 619,222

[22] Filed: Jun. 11, 1984

[30] Foreign Application Priority Data

Jun. 13, 1983 [IT] Italy .................................. 9455 A/83

[51] Int. Cl.$^4$ ............................................ A01D 87/12
[52] U.S. Cl. ................................. 414/24.6; 241/101.7; 414/24.5; 414/785
[58] Field of Search ..................... 241/101.7; 414/24.5, 414/24.6, 620, 622, 684, 721, 785, 911

[56] References Cited

U.S. PATENT DOCUMENTS

| | | | |
|---|---|---|---|
| 2,645,372 | 7/1953 | Broersma | 414/620 |
| 4,078,733 | 3/1914 | Popiolek | 241/200 |
| 4,082,198 | 4/1904 | Anderson | 241/101.7 |
| 4,411,573 | 10/1925 | Townsend | 414/24.6 |
| 4,449,672 | 5/1984 | Morlock et al. | 241/101.7 |

FOREIGN PATENT DOCUMENTS 2371868  7/1978  France ................................ 414/24.6

Primary Examiner—Robert J. Spar
Assistant Examiner—Janice Krizek
Attorney, Agent, or Firm—Browdy and Neimark

[57] ABSTRACT

Bale handling and hay distributing apparatus comprises a round-bale holder equipped with a device for rotating the bale around its central axis and a hay shredding unit. The bale holder is supported by a lift mechanism having a pair of vertically movable, projecting arms at the end of which the holder is pivotally connected. A device for rotating the bale holder with respect to the supporting lift mechanism is provided, so that the holder can be positioned in a hay dispensing position and in two different bale loading positions respectively rotated of an angle of 90° and 180° with respect to the hay dispensing position. Hooks projecting from the longitudinal sides of the holder are provided having a cooperating jaw-movement for grasping the bale during loading operation.

13 Claims, 7 Drawing Figures

U.S. Patent  Jul. 1, 1986  Sheet 1 of 2  4,597,703
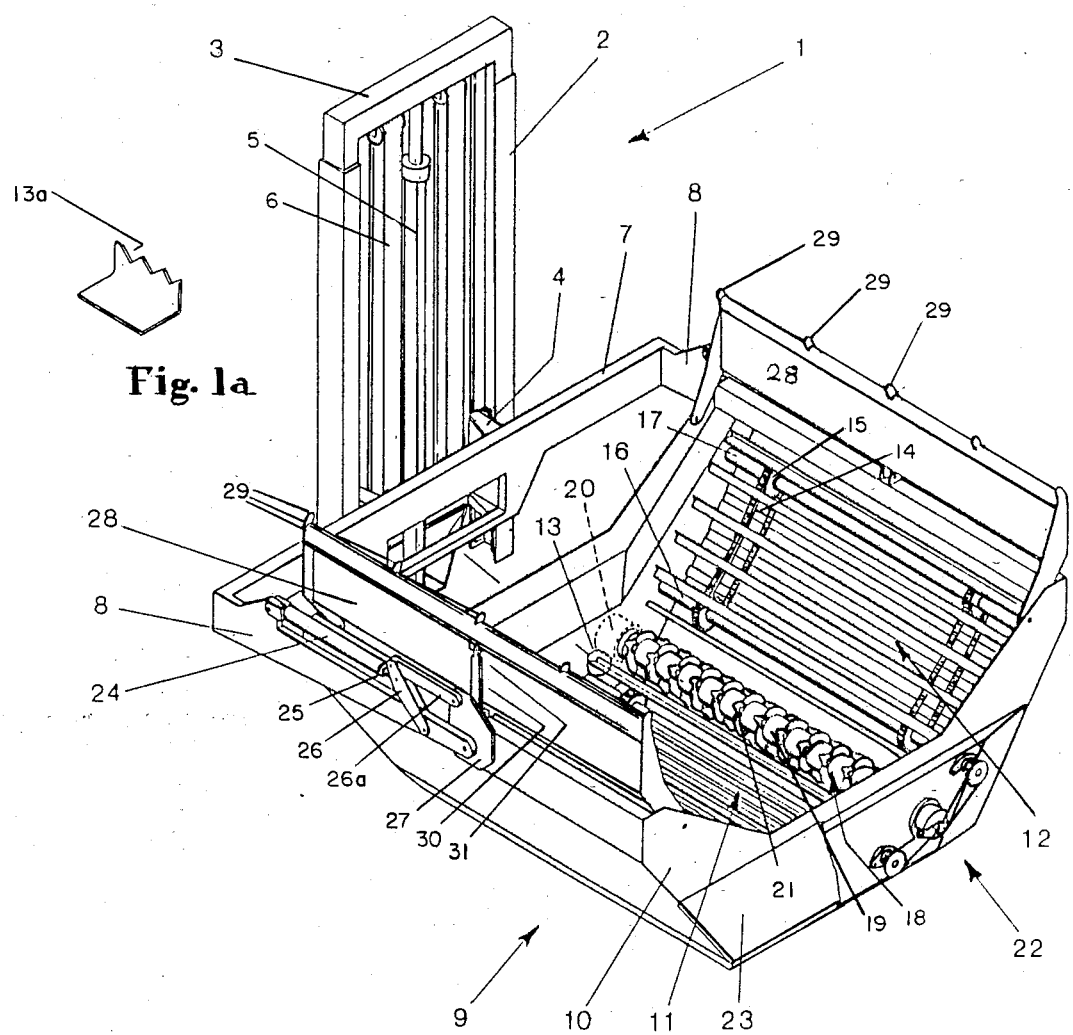
Fig. 1a
Fig. 1
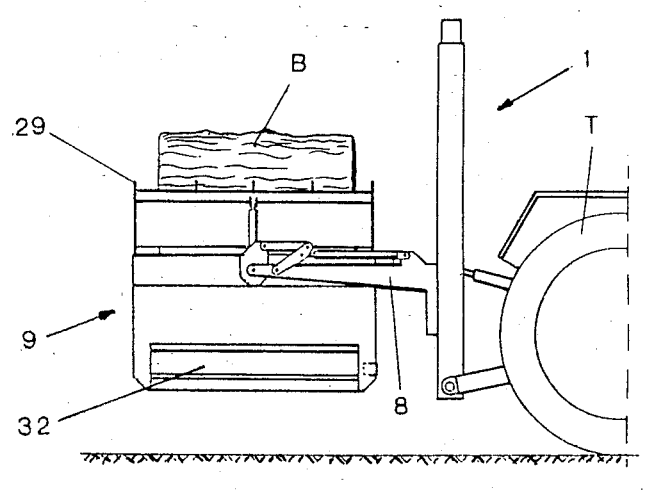
Fig. 2

BALE HANDLING AND HAY DISTRIBUTING APPARATUS

The present invention relates generally to agricultural equipment and more particularly to an apparatus for handling large bales of agricultural materials, such as hay, forage or the like, and for shredding and distributing such materials.

Agricultural material (hereinbefore generically referred to as "hay") are preferably baled into large cylindrical bales of 400–600 kg and more, formed of layers of hay spirally wound around a central axis, because of the significant advantages offered by this method over conventional methods. Thus, hay harvest and storing operations, as well as handling and distribution, can be profitably rationalized by the use of suitable equipment. Furthermore a better preservation of the stored hay is achieved.

Various mechanical equipment is actually available for performing the above mentioned operations. In particular, many bale unrolling apparatuses have been proposed. For instance, U.S. Pat. No. 4,078,733 discloses an apparatus for separating and distributing rolled bales of agricultural material wherein the apparatus is equipped with first endless conveyor means in the form of an inclined claw array, and a second endless conveyor means in the form of an oblique conveyor. In operation, a rolled bale is placed by means of a conventional transporting equipment, for example, a front or rear loader of a tractor, on the device. After removal of the ties from around the bale, the first and the second endless conveyor means are driven by a PTO shaft. As a result, the load bale is caused to form a rolling movement. The advance of the claw array leads to the bale being pressed against the oblique conveyor. While a plurality of retaining tines of the claw array will insure that the rolling movement is not more rapid than the advance of the claw array, a plurality of tearing tines will continuously tear a separate layer of hay material from the circumferential outer surface of the rolled-bale and will dispense the layer onto the ground. U.S. Pat. No. 4,411,573 discloses an apparatus that, besides performing the bale unrolling operation, provides also loading and transportation of the bales from storage. The apparatus can be attached to a farm vehicle and includes an endless conveyor for rotating and unrolling the bale and a hook mechanism for loading the bale so that, when the bale is unrolled, it is grasped between the conveyor and the hook mechanism.

Preferably, hay is shredded before being fed to the animals. The need of shredding hay is strongly felt by farmers, since in this form the hay is better assimilated by cattle, waste of material is greatly reduced and mixtures with other agricultural material used as food for cattle are made easier. In order to meet this requirement, hay shredding apparatuses have been provided generally used in combination with hay dispensing equipment and bale handling and unrolling apparatuses. It is therefore apparent that, in order to completely mechanize the bale handling and hay distributing process, several cooperating devices are desirably available in the farm. This fact may give rise to considerable investment and organization problems especially as far as small farms are concerned. A bale handling and shredding apparatus is disclosed in the U.S. Pat. No. 4,082,198, wherein the apparatus is of a vehicle trailer type and is equipped with a box or housing unit for containing a rolled-bale that is moved forwardly to a shredding unit by a floor conveyor. An openable rear side of the housing is provided to allow the bale loading. The shredded hay is then moved into an auger at the forward end of the housing unit for discharge into a feed bunk or storage bin. This type of apparatus is affected by considerable operating limits. Auxiliary loading equipment, or hand operation, is required to load the bales into the housing unit, when they are not properly stored (for example when they are stacked). Due to the way the shredding is carried out, when the weight and dimensions of the bale fall below a certain limit, further shredding is accomplished at a progressively decreasing efficiency thus reducing the feed rate of the shredded hay and leaving a portion of the bale that cannot efficiently be processed and therefore has to be removed to complete the shredding within an auxiliary device. Finally, it is difficult to manoeuvre especially during bale loading operation that cannot be easily controlled by the person driving the tractor to which the apparatus is connected.

The primary purpose of the present invention is to provide a bale handling and hay distributing apparatus which is able to perform the operations of loading the bales in the hay storage area and transporting them to the distribution area, as well as the operations of unrolling the bales and shredding the hay. The bales can be stored in a horizontal position or an upright position or stacked as well. All the operations that the apparatus of the invention is able to perform can be controlled by a single person driving an independent motor means of the apparatus of a usual farm tractor to which it is connected.

With respect to the prior art machinery, the apparatus according to the invention allows achieving appreciable savings of time and labour and permits a farm to completely mechanize the bale handling and hay distributing process with a reduced investment.

The bale handling and hay distributing apparatus according to the invention is relatively inexpensive, simple in construction and very easy to operate even in a very narrow space.

The bale handling and hay distributing apparatus according to the invention substantially comprises a round-bale holder equipped with means for rotating the bale around its central axis and a hay shredding unit. The bale holder is supported by a lift means having a pair of vertically movable projecting arms at the ends of which the holder is pivotally connected. Means for rotating the bale holder with respect to the supporting lift means are provided so that the holder can be positioned in a hay dispensing position, in which the bale is horizontally supported, and in two different bale loading positions respectively rotated of an angle of 90° and 180° with respect to the hay dispensing position, thereby enabling both horizontal, upright and stacked bales to be picked up. Hook means projecting from the sides of the holder adjacent to the support arms are finally provided for grasping the bale during loading operation.

In a preferred embodiment of the invention, the bale rotating means comprises two inclined, endless conveyors, converging substantially to the lowermost portion of the holder, where the shredding unit is installed therebetween. In particular, to improve the operating efficiency of the apparatus, the shredding unit is installed in a laterally displaced position with respect to the vertical plane containing the central axis of the bale and at least the endless conveyor installed upstream of the shredding unit, in the sense of rotation of the bale, is formed by an array of parallel bars having a toothed profile which engages with the circumferential outer surface of the bale, thus providing for the rolling movement thereof. The lift means may be of the self-propelled type, i.e. equipped with an independent motor, or may be suited for connection to an usual farm vehicle.

Other features and advantages of the bale handling and hay distributing apparatus according to the present invention will be apparent from the following description and the accompanying drawings which illustrate a preferred embodiment of the invention.

In the drawings:

FIG. 1 is a perspective view of the apparatus according to the present invention;

FIG. 2 is a schematic side elevational view of the apparatus of the invention in the hay dispensing position;

Figure 3:
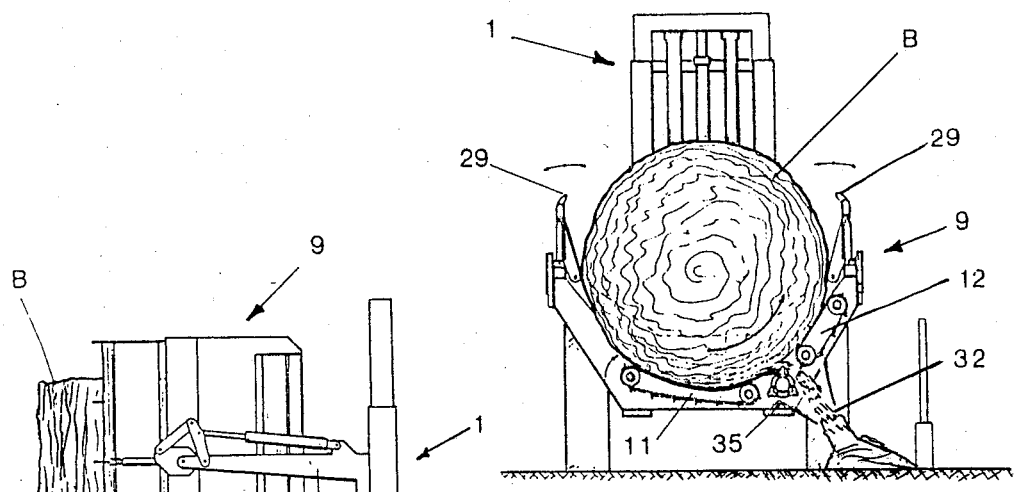
FIG. 3 is a schematic rear view of the apparatus in the position of FIG. 2.

With reference to FIG. 1, 1 generally indicates a lifting device, substantially of the conventional type, formed by a vertical frame 2 and mobile frame 3, slidably mounted on vertical frame 2 and supporting a carriage 4 that slides vertically along mobile frame 3. The movements of mobile frame 3 and carriage 4 are controlled by piston means 5 and chain drive means 6 in a known way. A transverse beam 7 integral to carriage 4 carries at its ends two horizontal, parallel arms 8. Arms 8 support a holder 9 for a rolled-bale B of hay. Holder 9 is formed by a substantially semicylindrical frame 10, pivotally connected to the free ends of arms 8, the pivotal axis of holder 9 being thus horizontal and parallel to transverse-beam 7.

Bale holder 9 is equipped with two endless conveyors 11 and 12, inclined and converging substantially to the lowermost portion thereof. Conveyors 11 and 12 are arranged in an end-to-end relation and cover most of the inner wall of frame 10. Each conveyor 11 or 12 is formed by an array of L-shaped bars 13, parallel and spaced apart, fixed to a pair of chains 14 engaging with pinions 15 carried by shaft 16 and 17 supported by frame 10 of holder 9. Between conveyors 11 and 12, in a position substantially corresponding to the axis to which they converge, there is installed a hay shredding unit 18 supported by frame 10 of bale holder 9. Shredding unit 18 comprises a rotating shaft 19 directly driven by a motor 20 and a plurality of shredding blades 21 radially extending from shaft 19. From shaft 19 of shredding unit 18 the motion is transmitted to drive shafts 16 of conveyors 11 and 12 by a gear transmission means, generally indicated at 22, located at the rear side wall of frame 10 and covered by a carter 23 for safety. Conveyors 11 and 12 have different inclination with respect to the horizontal. In particular, conveyor 11, located upstream with respect to shredding unit 18, is less inclined than downstream conveyor 12. Furthermore, L-shaped bars 13 of conveyors 11 have a portion perpendicularly extending from the plane thereof, which presents a toothed profile 13a (as shown in the enlarged fragmentary view of FIG. 1) suited for engaging with the outer surface of the bale. From the foregoing, it is apparent that, while conveyors 11 and 12 move at the same speed and in the same direction, the upstream conveyor 11 is mainly responsible for the rolling movement of bale B and the downstream conveyor 12 follows the movement of the rolling bale and operates as an inclined wall for keeping the bale in the proper shredding position.

For an optimum shredding operation, the bale B of hay must force against blades 21 of the shredding unit 18. To this purpose the position of rotating shaft 19 is laterally displaced with respect to the vertical plane containing the central axis of the bale, in such a way that the resulting force acting on the bale (i.e. the resultant of the weight and moving force) is radially directed from the central axis of the bale towards shaft 19.

Figure 4:
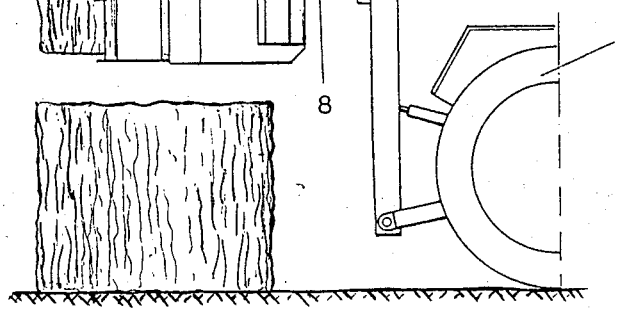
FIG. 4 is a schematic side elevational view of the apparatus of the invention in a first bale loading position.
Figure 5:
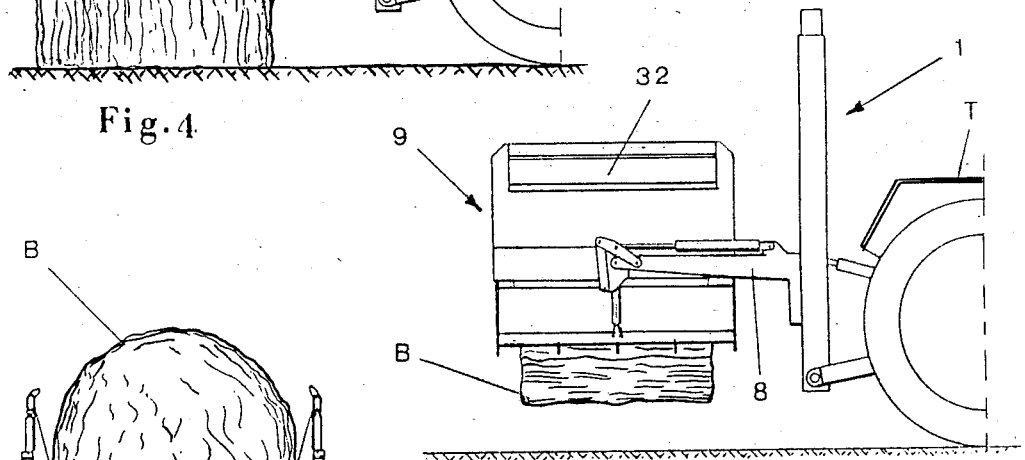
FIG. 5 is a schematic side elevational view of the apparatus of the invention in a second bale loading position.

The position of bale holder 9 shown in FIG. 1 is that corresponding to the hay dispensing position, which is shown in FIG. 2 and FIG. 3, as well. Holder 9 can be positioned in two different bale loading positions by rotation of an angle of 90° or 180° respectively, with respect to the hay feeding position, around the pivotal axis parallel to transverse beam 17. These loading positions of holder 9 are shown in FIG. 4 and FIG. 5 respectively. To rotate holder 9, a pair of hydraulic cylinders 24 are pivotally connected to arms 8, each cylinder extending along the relevant arm 8. The piston-rod 25 of each cylinder 24 is connected to a first lever 26 having its ends pivotally connected to arm 8 and, respectively, to a second lever 26a pivotally connected to a plate 27 integral to frame 10 of holder 9. Thus, when piston rods 25 are completely retracted, holder 9 is in the hay dispensing position, whereas, when piston rods 25 are in their partially or totally extended position, holder 9 is angularly displaced of an angle of 90° and 180° respectively with respect to said hay feeding position.

In order to allow grasping of a bale B when holder 9 is placed in either loading position, there are provided two side panels 28 extending upwardly from the longitudinal side edges of holder 9 parallel to arms 8, each side panel 28 having a row of hook-shaped projections 29 for engaging with the bale when grasping it.

Side panels 28 are pivotally connected to the relevant edges of holder 9, in such a way that they operate like a pair of jaws. To move side panels 28, respective hydraulic cylinders 30 are provided having their forward end pivotally supported on frame 10 with the piston rods 31 connected to side panels 28. The apparatus according to the invention may be equipped with an independent drive motor or, as shown in FIGS. 2 to 5, connected to the front or back end of a tractor T and actuated by the same. As clearly shown in FIG. 4 and FIG. 5, bale loading operation is extremely simple, both when they are stored in a horizontal position (in this case holder 9 is rotated of an angle of 180° with respect to the hay dispensing position) and when they are stored in a vertical or upright position (in this case holder 9 is rotated of an angle of 90° with respect to the hay dispensing position). Finally, if the bales are stacked, holder 9 will be angularly rotated and lifted as necessary. The operator sitting on the tractor controls the above movements and the movements of side panels 29 when the bale has to be grasped. Once a bale has been loaded, holder 9 is rotated back to the hay dispensing position, while the apparatus is driven to hay dispensing area. Then motor 20 is started, thus rotating shaft 19 of shredding unit 18 and simultaneously moving conveyors 11 and 12. The shredded hay is discharged from a side outlet 32 (shown in FIGS. 2 to 5) located below the shredding unit 18, while the tractor moves forward along, for instance, a fodder trough.

Advantageously, the position of shaft 19 of shredding unit 18 can be adjusted to register the distance from the surface of the bale, thus allowing more or less blade penetration according to the type of material to be shredded. Furthermore, when particularly fibrous forage has to be shredded, the side outlet 32 can be equipped with fixed counterblades 35 in order to provide a better mincing of the product and avoid the risk of flooding the unit 18.

Figure 6:
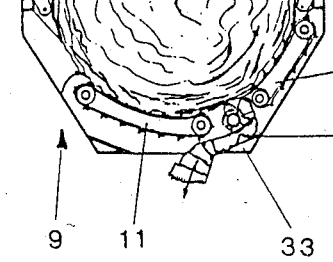
FIG. 6 and FIG. 7 are schematic rear views showing different hay discharge systems.
Figure 7:
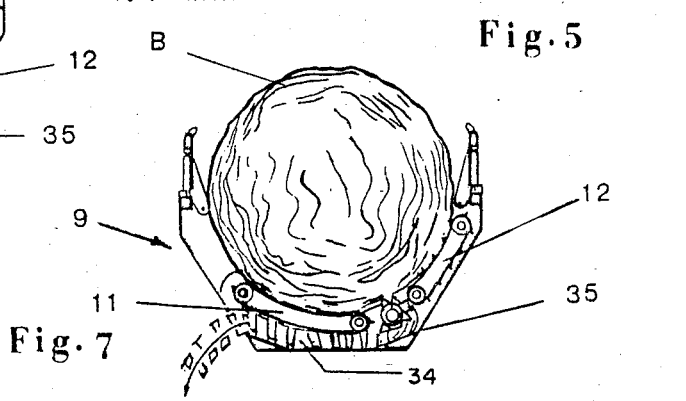

The shredded hay can be also discharged from a central position as shown in FIG. 6. Below the shredding unit 18 in this case there is provided a chute 33 for collecting the hay to a central disharge position below the bale B. The above solution may be necessary when the shredded hay has to be discharged into a central trough. Hay may be disharged also from the opposite side of the holder with respect to the shredding unit 18 as shown in FIG 7. To this purpose a collecting duct 34 is provided under frame 10 where the shredded hay is forced to move forward by the action of shredding blades 21.

Although the invention has been described with respect to a preferred embodiment thereof, it is to be understood that it is not be so limited since changes and modification can be made therein which are within the scope of the invention as defined by the appended claims.

I claim:

1. Apparatus for handling round-bales of agricultural material and for distributing said material, said bales being formed of layers of the material spirally wound around a central axis, comprising:
   (a) lift means having a pair of vertically moving, parallel elongated arms;
   (b) a round-bale holder of generally U-shaped cross-section pivotally supported by said pair of arms at a pivot axis approximately mid-length of said holder, said pivot axis extending through the legs of the U;
   (c) means for rotating the bale around its central axis within said holder;
   (d) a shredding unit for said material within said holder;
   (e) means for rotating said bale holder with respect to said lift means about said pivot axis from a shredded material dispensing postion where said U is upright to two different bale loading positions rotated of an angle of 90° wherein the length of said holder is disposed vertically and, respectively, of 180° wherein said U is inverted with respect to said dispensing position;
   (f) hook-means extending from each leg of said holder for grasping the bale during loading operation.

2. The apparatus according to claim 1, wherein said bale rotating means comprises two endless conveyors, arranged in a end-to-end relation, inclined and converging, said shredding unit being installed therebetween; and means to drive said conveyors at substantialy the same rate of speed.

3. The apparatus according to claim 2, wherein said endless conveyors have different inclination with respect to the horizontal, said shredding unit being installed on a laterally displaced position with respect to the vertical plane containing the central axis of the bale.

4. The apparatus according to claim 3, wherein the conveyor installed upstream of said shredding unit is less inclined than the downstream conveyor.

5. The apparatus according to claim 2, wherein each of said endless conveyors comprises an array of parallel, substantially L-shaped bars, at least the bars of the endless conveyor installed upstream of said shredding unit having a toothed profile for engaging with the surface of the bale.

6. The apparatus according to claim 1, wherein said shredding unit comprises a rotating shaft and a plurality of shredding blades radially extending therefrom.

7. The apparatus according to claim 1, wherein said holder rotating means comprises a piston means integral with said arms for actuating a lever mechanism pivotally connected to said arms and said holder.

8. The apparatus according to claim 1, wherein said hook means comprises a pair of side panels, extending from the longitudinal edges of said holder, equipped with a row of hook-like projections for penetrating the bale, said side panels being cooperatively moved during loading operation for grasping the bale.

9. Apparatus for handling round-bales of hay or the like and for distributing said hay material, said bales being formed of at least one layer of the hay spirally wound about a central axis, comprising:
   a round-bale holder of elongated generally U-shaped cross-section for supporting therewithin a round bale of hay;
   vertically movable fork-lift means having a pair of parallel elongated arms for supporting said bale holder, said bale holder being pivotally supported by said pair of arms at a pivot axis approximately mid-length of said bale holder;
   means for rotating the bale around its central axis within said holder, when said holder is in a hay dispensing position, said bale rotating means comprising two endless conveyors arranged in end-to-end relation, inclined and converging;
   a shredding unit for said hay within said holder, and means to activate said shredding unit when said bale is rotated about its central axis within said holder while in the dispensing position, said shredding unit comprising a rotating shaft and a plurality of shredding blades radially extending therefrom and located between said endless conveyors;
   the central axis of the bale, the length of said holder and said parallel elongated arms of said lift means all being generally parallel to one another in said dispensing postion; and
   means for rotating said bale holder with respect to said lift means about said pivot axis from said dispensing position 90° to a first bale loading position wherein said holder is generally vertically disposed to pick up vertically disposed bales, and to a second bale loading position disposed 180° from said dispensing position.

10. An apparatus according to calim 9 further comprising means to drive said conveyors at substantially the same rate of speed.

11. An apparatus according to claim 10 further comprising bale grasping means extending from two opposite sides of said holder for grasping a bale during loading.

12. An apparatus according to claim 9 wherein hook means extend from two opposite sides of said holder for grasping the bale during loading operation, wherein said hook means comprises a pair of side panels extending from the longitudinal edges of said holder, equipped with a row of hook-like projections for penetrating the bale.

13. Apparatus for handling round-bales of agricultural material and for distributing said material, said bales being formed of layers of the material spirally wound around a central axis, comprising:

(a) lift means having a pair of vertically moving, parallel elongated arms, (b) a round-bale holder of elongated generally U-shaped cross-section pivotally supported by said pair of arms at a pivot axis approximately mid-length of said holder, said pivot axis extending through the legs of the U, (c) means for rotating the bales around its central axis within said holder, the means comprising two endless conveyors, arranged in an end-to-end relation, inclined and converging, a shredding unit being installed therebetween, and means to drive the conveyors at substantially the same rate of speed, (d) a shredding unit for said material within said holder, (e) means for rotating said bale holder with respect to said lift means about said pivot axis from a shredded material dispensing position where said U is upright to two different bale loading positions rotated of an angle of 90° wherein the length of said holder is disposed vertically and, respectively, of 180° wherein said U is inverted with respect to said dispensing position, (f) hook-means extending from each leg of said holder for grasping the bale during loading operation, wherein said hook means comprises a pair of side panels extending from the longitudinal edges of the legs of said holder, equipped with a row of hook-like projections for penetrating the bale, said side panels being cooperatively moved during loading operation for grasping the bale.

* * * * *